United States Patent [19]

Perrotti et al.

[11] Patent Number: 4,879,090
[45] Date of Patent: Nov. 7, 1989

[54] SPLIT VANED NUCLEAR FUEL ASSEMBLY GRID

[75] Inventors: Patrick A. Perrotti, Newington; Paul F. Joffre, Colchester; Zeses E. Karoutas, Simsbury; Lawrence V. Corsetti, Granby; William J. Bryan, Granby; Stephen C. Hatfield, Granby, all of Conn.

[73] Assignee: Combustion Engineering, Inc., Windsor, Conn.

[21] Appl. No.: 88,439

[22] Filed: Aug. 24, 1987

[51] Int. Cl.⁴ .............................................. G21C 3/18
[52] U.S. Cl. .................................... 376/462; 376/442; 376/439
[58] Field of Search ........................ 376/442, 441, 462

[56] References Cited

U.S. PATENT DOCUMENTS

| | | | |
|---|---|---|---|
| 3,442,763 | 5/1969 | Chetter et al. | 376/442 |
| 3,715,275 | 2/1973 | Krawiec | 376/442 |
| 3,844,887 | 10/1974 | Georges et al. | 376/442 |
| 4,007,899 | 2/1977 | Piepers et al. | 376/442 |
| 4,028,180 | 6/1977 | Finch | 376/442 |
| 4,125,435 | 11/1978 | Jabsen | 376/442 |
| 4,163,690 | 8/1979 | Jabsen | 376/442 |
| 4,426,355 | 1/1984 | Burger | 376/442 |
| 4,585,615 | 4/1986 | DeMario | 376/442 |
| 4,594,216 | 6/1986 | Feutrel | 376/442 |
| 4,692,302 | 9/1987 | DeMario et al. | 376/442 |

*Primary Examiner*—Harvey E. Behrend
*Attorney, Agent, or Firm*—John H. Mulholland

[57] ABSTRACT

Integral vanes 4 with optimized size, shape and bend angles maximize coolant mixing and fuel rod 12 heat transfer downstream. Recessed weld nuggets 5 with no vane cutout are optimized for size, strength and corrosion resistance. Staggered arches 20',22' and springs 20,22 minimize turbulence and reduce grid pressure drop and promote coolant mixing. Crowned arches 20',22' and springs 20,22 decrease scoring of fuel rods 12 and are sized to minimize turbulence and pressure drop. Minimum cutouts in unslotted section of grid strip 46,46' give 15-20% strength increase. Intermediate weld and tapered end slots 48 give 15% strength increase. Ribbed and round dimple stiffeners 38,39 on outer strips increase buckling resistance, reduce handling damage and spreads accidental loading. Outer strips 32 are optimized for strength, handling, turbulence generation and pressure drop. They also divert enough flow to interior of fuel assembly to match thermal power distribution and eliminate fuel rod corrosion concerns.

4 Claims, 5 Drawing Sheets

SPLIT VANED NUCLEAR FUEL ASSEMBLY GRID

BACKGROUND OF THE INVENNTION

The invention described herein relates to nuclear reactor fuel assemblies and more particularly to a zircaloy fuel assembly grid designed to improve strength, and reactor performance, and to be manufactured at a cost less than conventional grids.

It is well known that the fuel or fissionable material for heterogeneous nuclear reactors is conventionally in the form of fuel elements or rods which are grouped together. These groupings or fuel assemblies also include rods comprising burnable poisons and hollow tubes through which control element assemblies are arranged to pass. The liquid moderator-coolant, normally water, flows upwardly through the reactor core in channels or longitudinal passageways formed between the members that comprise the core. One of the operating limitations on current reactors is established by the onset of film boiling on the surfaces of the fuel elements. The phenomenon is commonly referred to as departure from nucleate boiling (DNB) and is affected by the fuel element spacing, system pressure, heat flux, coolant enthalpy and coolant velocity. When DNB occurs, there is a rapid rise in the temperature of the fuel element due to the reduced heat transfer which can ultimately result in failure of the element. Therefore, in order to maintain a factor of safety, nuclear reactors must be operated at a heat flux level somewhat lower than that at which DNB occurs. This margin is commonly referred to as the "thermal margin".

Nuclear reactors normally have some regions in the core which have a higher neutron flux and power density than other regions. This situation may be caused by a number of factors, one of which is the presence of control rod channels in the core. When the control rods are withdrawn, these channels are filled with moderator which increases the local moderating capacity and thereby increases the power generated in the fuel. In these regions of high power density known as "hot channels", there is a higher rate of enthalpy rise than in other channels. It is such hot channels that set the maximum operating conditions for the reactor and limit the amount of power that can be generated, since it is in these channels that the critical thermal margin is first reached.

Attempts have been made in the past to solve these problems and increase DNB performance by providing the support grid structures employed to contain the members of the fuel assembly with integral flow deflector vanes. These vanes can improve performance by increasing coolant mixing and rod heat transfer ability downstream of the vanes. These attempts to improve performance have met with varying success depending on the vane design and the design of other grid components which can impact the effectiveness of vanes. To maximize the benefit of the vanes, the size, shape, bend angle, and location of the vanes must be optimized. The vanes are especially beneficial adjacent to the aforementioned hot channels. The remaining components of the grid which include the strips, rod support features and welds must be streamlined to reduce the turbulence generated in the vicinity of the vanes. Further constraints on designing the grids include minimizing grid pressure drop and maximizing grid load carrying strength.

Grids are generally of a first and second plurality of half-slotted strips in "egg-crate" configuration and are spaced along the fuel assembly to provide support for the fuel rods, maintain fuel rod spacing, promote mixing of coolant, provide lateral support and positioning for control assembly guide tubes, and provide lateral support and positioning for an instrumentation tube. The grid assembly usually consists of individual strips that interlock to form a lattice. The resulting square cells provide support for the fuel rods in two perpendicular planes; in general, each plane has three support points: two support arches and one spring. The springs and arches are stamped and formed in the grid strip and thus are integral parts of the grid assembly. The springs exert a controlled force, preset so as to optimally maintain the spring force on the fuel rod over the operating life of the fuel assembly.

Fuel assemblies employing spacer grids with flow deflector vanes of the prior art have usually been fabricated substantially or entirely of Inconel or a zirconium-tin alloy, i.e., zircaloy. An Inconel grid has the advantage of greater strength because of better material characteristics and because the brazing process bonds the intersection of the strips along its entire length. Brazing also has the advantage of providing little or no obstruction to flow. Due to the increased strength, the strip thickness of an Inconel grid can be reduced relative to the zircaloy grid to reduce pressure drop and turbulence in the vicinity of the vanes. The use of annealed zircaloy has been directed by its desirable combination of mechanical strength, workability, and low neutron capture cross-section. The most important of these characteristics is its low neutron capture cross-section which makes the nuclear fission more efficient, thus making the nuclear reactor operate more economically. However, to achieve a strength equivalent to that of an Inconel grid, the strip thickness for a zircaloy grid must be increased, thus creating more turbulence and higher pressure drop. Also, the joining of the interlocking zircaloy strips has always been by welding which requires the melting of some grid material to form a weld nugget. The increases strip thickness and weld nuggets for zircaloy grids of the prior art increase turbulence and grid pressure drop and reduce the effectiveness of the vanes. Therefore, the DNB performance of a zircaloy grid containing flow vanes of the prior art will be degraded relative to an Inconel grid design.

In U.S. Pat. No. 4,089,741, a split vaned grid is disclosed in which first and second welding tabs are disposed in intersecting relation. Fusing of the protruding tabs at the intersection points down into the intersection joints occurs such that the protruding tabs are consumed whereupon there is formed in said vanes an opening at the base thereof, but within the bent and flow exposed vanes and not the vertical sections supporting them. The openings have a shape of the same general configuration as that of said first protruding tab, whereby flow is through the opening and in that patent, it is alleged the flow mixing capability of said spacer is improved.

FIG. 1 is a prior art view showing what happens to create flow separation when a vane such as that of U.S. Pat. No. 4,089,741 has a nugget weld "unshielded" from the flow and an opening in the vane itself.

U.S. Pat. Application Ser. No. 856,888 of Donald W. Krawiec, now U.S. Pat. No. 4,725,402 assigned to the assignee of the instant invention teaches "shielding" the weld nugget from the flow path within the confines of the strips in openings along their lines of intersection, to minimize pressure drop. This application does not specifically disclose integral vanes of the type in U.S. Pat. No. 4,089,741, however, which have openings which increase pressure drop by flow separation during flow therethrough.

Water table tests were performed to visualize how the weld nugget and the welding hole cutout in the prior art vane for a nugget affects the flow passing by and through the vane. FIG. 1 illustrates the prior art flow pattern with a nugget and its weld hole in the vane. It can be seen that the weld nugget/weld access hole generates a very large wake, which, in turn, promotes decay of the vane effectiveness downstream of the grid. Velocity measurements downstream of the grid, both in water table tests and in an air model, using Laser-Doppler Anemometry, support the claim that the vane of the invention is more effective in directing the flow into the fuel rod gap because the weld nugget/weld access hole is not present in the vane.

SUMMARY OF THE INVENTION

The present invention overcomes the above briefly discussed deficiencies and disadvantages of the prior art by enhancing the strength and mixing ability of the grid. Grids employing the present invention have a measurable beneficial effect on reactor performance, operating cost and efficiency when compared to the prior art.

In accordance with the invention, the crush strength of a zircaloy reactor fuel assembly spacer grid is increased. This increase is principally attributable to a novel and improved perimeter and interior strip. The novel perimeter strip is characterized by small stiffening ribs and round dimple stiffening features, both of which have been located differently in the prior art, as seen, for example, in U.S. Pat. Nos. 4,224,107 and 3,751,335. The ribs of the invention extend around the perimeter strips at two elevations and are ridged inwardly. The dimples also extend inwardly into some or all of the fuel rod receiving grid sectors serving to rigidize the perimeter strip and functioning as either arches for fuel rod support or backup arches for the integral fuel rod positioning springs which extend inwardly from the perimeter strip. The junction of the internal strip to the perimeter strip, in accordance with the present invention, is characterized by a weld seam of substantially greater length than has previously been employed. The increased weld seam length also enhances the strength of the grid.

Interior orthogonal strips are designed to limit cutouts in the unslotted section of the strip. This is accomplished by the use of small cantilevered springs, designed to laterally impress a controlled resistive force on each fuel rod. The spring's size allows it to be located in the slotted section of the interior grid strip. The design maintains a load path through the unslotted interior strip which is much larger than in the prior art and thus leads to a much higher strength grid as compared to grids of equal size of the prior art.

In addition, grid support features, i.e. support arches and springs, have been positioned in a staggered manner so that turbulence produced is minimized, thus obtaining even better performance from the integral flow deflector vanes. The staggered positioning of grid support features also reduces grid pressure drop and promotes coolant mixing by staggering the flow through a grid cell.

DNB tests performed for the zircaloy grid design indicate these unique features significantly increase coolant mixing and DNB performance by comparing the test results to an Inconel grid design with similar flow vanes. These comparisons verified that the zircaloy grid design produced improvements in performance relative to the Inconel design.

As described previously, grids are formed of "eggcrate" construction by zircaloy strips which form multiple cells or sectors, each sector having springs on two adjacent walls and a pair of projections or arches on each of the other two walls forming a sector. The springs laterally impress controlled resistive forces on each fuel rod in the assembly. Although this fuel assembly design performs exceptionally well in a nuclear reactor, one disadvantage inherent in the design is that the inwardly projecting springs and arches occasionally mark or score the surface of fuel rods during the time they are being pulled or pushed into the fuel assembly grids. In carrying out this fuel rod loading operation, the grids are held immovably in position while a longitudinal steel rod attached to the end of a fuel rod push or pull it axially through the aligned openings or sectors in the grids. As the rod engages the springs and arches in the grid sectors, their edges engage the exposed surface of the moving fuel rod and, in some cases, score its surface sufficiently deep so as to cause the rod to fall outside established fuel rod surface specifications. To eliminate this problem, arches and springs have been designed with a crown. The crown's size has again been optimized with respect to flow blockage to minimize turbulence and pressure drop and the scorability of the rod.

The number of spacer grids employed in a single fuel assembly will be minimized, to an extent commensurate with structural requirements, in the interest of enhancing reactor operating efficiency. While possessing adequate resistance to buckling under normal operating conditions, laboratory tests have shown that prior art zircaloy spacer grids may not have the mechanical strength required to absorb severe lateral stresses as might be encountered as a result of high seismic loading. Higher strength grids are required in plants whose locations are in areas of high seismic activity. While the strength of reactor fuel assembly spacer grids could be increased by the use therein of metals having a greater stiffness than annealed zircaloy, most of such higher strength materials are also characterized by higher neutron capture cross-section when compared to zircaloy and a principal objective in the design of a fuel assembly for a nuclear reactor is to maximize operating efficiency by minimizing neutron capture.

To maintain a zircaloy grid strip material while obtaining the required strength, the unslotted section of the grid strip was provided with minimum cutouts. This was accomplished by the use of a small cantilevered spring, designed to laterally impress a controlled resistive force on each fuel rod. The spring's size allowed it to be located in the slotted section of the grid strip. The design maintains a continuous load path of unslotted material which is much larger than previous art and thus has a much higher strength as compared to grids of equal thickness and height. Tests have been performed which support this claim and have shown an increase in strength of 15-20% over grids of the prior art.

Intermediate welds of the type taught in U.S. Application Ser. No. 856,888, now U.S. Pat. No. 4,725,402 were also provided to improve the strength of the grid.

The slots were tapered at their ends to facilitate welding at intermediate locations, thus improving grid strength. Tests have also been performed which support this claim and have also shown an increase in strength of approximately 15% over grids of the prior art. This increase would be additive to that described in the paragraph above.

The outer strips of the grid have also been optimized with respect to strength, handling, turbulence generation, and pressure drop. To obtain additional strength, small ribbed and round dimple stiffeners were employed along the strip's entire length. These stiffeners did not only increase the buckling resistance of the grid but improve the strip's resistance to interact, i.e catch or hang-up with adjacent fuel assemblies which reduces the potential for handling damage. In addition, the optimized outer strip design more effectively spreads accident loadings throughout the grid interior strips thus increasing strength. The outer strip also diverts just enough flow to the interior of the fuel assembly to match the thermal power distribution of the fuel array and eliminate any corrosion concerns on peripheral fuel rods.

The novel features described herein summarize the improvements made to a straight strip zircaloy grid containing flow vanes to improve upon reactor performance, load carrying strength, pressure drop, and handling performance relative to zircaloy grid designs of the prior art.

To improve reactor performance, the integral flow deflector vanes were optimized with respect to size, shape, and bend angle in order to maximize coolant mixing and fuel rod heat transfer downstream of the vanes. The weld nuggets were optimized with respect to size, strength, corrosion resistance, and location, i.e., the nugget is positioned upstream in the grid strip and is shielded by the integral flow deflector vanes. By recessing the nugget into the grid with no cutout in the vane, the turbulent wake produced by the nugget and cutout has less impact on vane performance.

The location of the nuggets, upstream and shielded by the integral flow deflector vanes, leads to less turbulent wakes and better vane mixing and fuel rod heat transfer performance than the prior art. The novel staggering of grid support features also increased vane performance and lowered grid pressure drop as compared to prior art.

It will occur to those skilled in the art that the grid strip thickness can be reduced by virtue of the increased strength provided by the staggered support configuration and the stronger outer strip design. This, in turn, reduces the pressure loss experienced by the coolant in flowing through the reactor core.

Having in mind the above and other objects that will be evident from an understanding of this disclosure, the present invention comprises the combinations and arrangements and method as illustrated and disclosed in the presently preferred embodiment of the invention which is hereinafter set forth.

BRIEF DESCRIPTION OF THE DRAWINGS

While the foregoing discussion identifies problems presently existing in the prior art together with a general description of how they may be overcome, it is believed the following disclosure of the preferred embodiment of the invention will be better understood by those skilled in the art by reference to the accompanying drawings wherein.

DESCRIPTION OF THE PREFERRED EMBODIMENT

Figure 1:
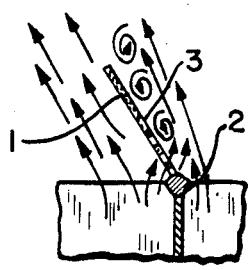
FIG. 1 is a schematic elevational view of a Prior Art mixing vane with an opening which produces flow separation.
Figure 2:
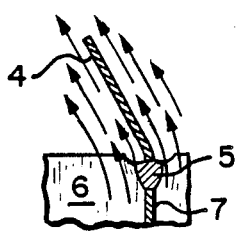
FIG. 2 is a schematic elevational view of a mixing vane according to the present invention illustrating alleviation of the fluid separation flow problem.

Referring now to the drawings, as previously noted, FIGS. 1 and 2 are schematic views of vanes. FIG. 1 is a prior art type of vane 1 with a weld nugget 2 and opening 3. Arrows illustrate the flow obtained. FIG. 2 illustrates the flow obtained when the same test is performed on a vane 4 without a weld nugget or opening, but with the weld nugget 5 "shielded" by the full vane 4 and by the thickness of the strips 6 and 7. The weld nugget 5 lies substantially within the transverse confines of the strips 6 and 7 in the case of a grid structure provided in accordance with the principles of the invention.

Figure 3:
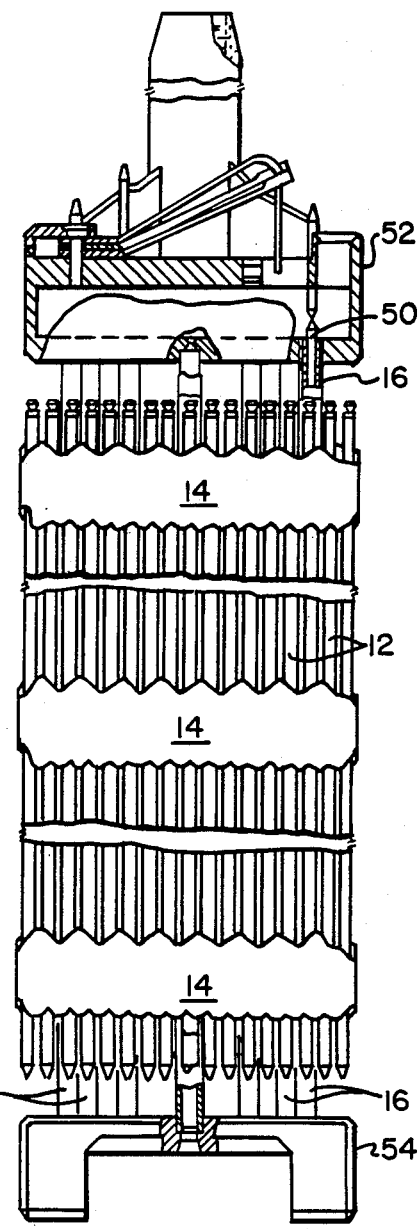
FIG. 3 is an elevational view, partly in section, of a fuel assembly illustrating the relationship of the grids of the invention to other components in the fuel full assembly.

FIG. 3 shows a nuclear reactor fuel assembly 10 comprising an array of fuel rods 12 held in spaced relationship with each other by grids 14 spaced along the fuel assembly length.

Fuel assembly 10 includes, extending longitudinally therethrough, guide tubes 16. Control rods 50, in the form of neutron absorber elements, move within guide tubes 16; such control rods serving as a means for regulating the thermal output power of the reactor. The fuel assembly also includes a plurality of fuel rods 12. Each fuel rod 12 comprises a hermetically sealed elongated tube, known in the art as the cladding, which contains a fissionable fuel material, such as uranium, in the form of pellets. As may best be seen from FIG. 3, the individual fuel rods 12 are supported in the fuel assembly by means of a plurality of spacer grids 14, such that an upwardly flowing liquid coolant may pass along the fuel rods thus preventing overheating and possible melting through of the cladding. In the manner well-known in the art, the coolant, after passing through the reactor core and being heated through contact with the fuel rods, will be delivered to a heat exchanger and the heat extracted from the circulating coolant will be employed to generate steam for driving a turbine.

As noted, and as may be seen from FIG. 3, the positioning and retention of the fuel rods in fuel assembly 10 is accomplished through use of a plurality of the spacer grids 14. All or several of the spacer grids 14 may be of the improved design depicted in FIGS. 4–12.

It is to be noted that due to differential expansions which will not be described herein, when the reactor is running hot, the spacing between the fuel assemblies will be larger than under cold conditions. The aforementioned spacing includes the clearance left between fuel assemblies to accommodate thermal and irradiation induced growth. Under a seismic load, the fuel assemblies could, with this spacing, move about and impact against each other and against the walls of the core shroud. Such impacts could, if sufficiently strong, cause the permanent distortion of the fuel assembly spacer grids of the prior art, could also cause bending of the guide tubes and could result in damage to the cladding of individual fuel assemblies through varying the coolant flow characteristics of the fuel assembly or otherwise. Additionally, seismically induced stresses could exceed the elastic limit of the integral grid assembly springs of the prior art fuel assemblies, this being particularly true for those springs in the outer rows of the fuel assemblies.

Figure 4:
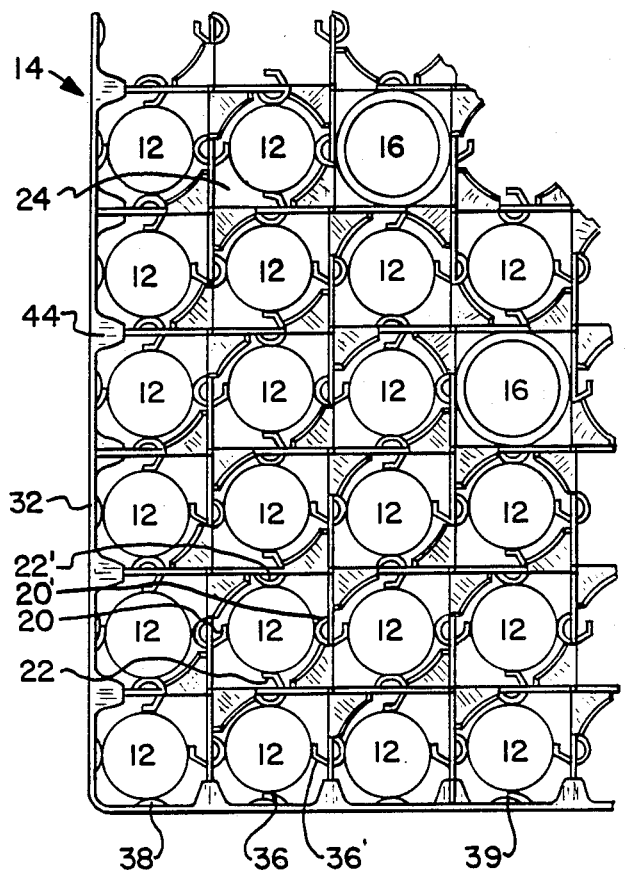
FIG. 4 is a fragmentary plan view of an improved spacer grid for the fuel assembly of FIG. 3, illustrating the relationship of springs, dimples, arches, and strips used for holding fuel rods and guide thimbles in a set position (alternate bend configurations are used for vanes adjacent to guide thimbles)

With reference now jointly to FIGS. 4–12, each of the zircaloy spacer grids 14 support and align the fuel rods 12 through the establishment of six points of contact therewith. Thus, as depicted in FIG. 4, each of the fuel rods 12 is contacted by a pair of generally transversely oriented springs 20,22 which respectively urge the fuel rod against oppositely disposed stop members 20' and 22' in each sector or cell of the grid. The stop members 20' and 22' will customarily be provided in pairs with the individual stops of each pair being respectively vertically above and below a plane through the point of contact of the springs 20,22 with the cladding of fuel rod 12. Thus, considering fuel rod 12, this element is urged by means of springs 20 and 22 against pairs of arches 20' and 22' formed respectively on upper strip members 46 and lower strip members 46'.

The spacer grid 14 is assembled by interweaving of the internal strip members 46 and 46'. The ends of the strip members 46, 46' may be engaged in slots 30 provided in the spacer grid perimeter strip 32. Welds are formed at all points of the intersection within the spacer grid and the ends of the strip members 46,46' are either welded into the slots 30 in perimeter strip 32 or are butt welded to the perimeter strip. When compared to the prior art, the spacer grid 14 of the present invention has a longer internal strip to perimeter strip weld because the slots 30 run the full transverse width of the perimeter strip 32 exterior plane and thus provide greater strength.

Figures 5, 6:
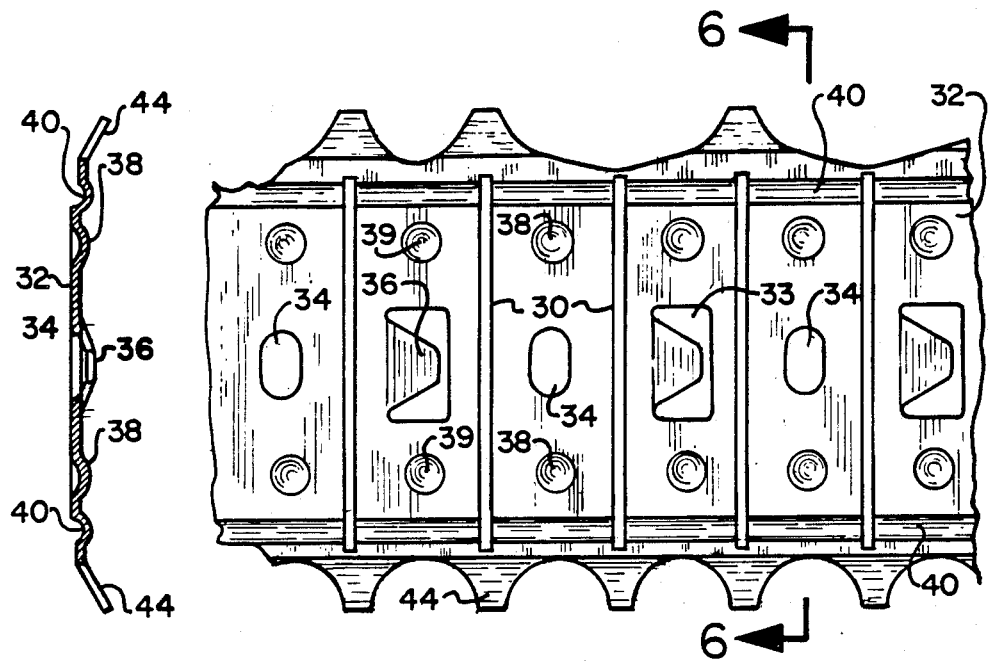
FIG. 5 is a partial side elevation view of the spacer grid of FIG. 4.
FIG. 6 is a cross-sectional side-elevational view of the perimeter strip of the spacer grid of FIGS. 3 and 4 taken along line 6—6 of FIG. 5.

Referring to FIG. 5, perimeter strip 32 is provided with cutouts or "windows" 34 in regions corresponding to alternate sectors of the outer row of the spacer grid. These "windows" which are of smaller dimensions when compared to the windows of the prior art perimeter strips, such as shown in U.S. Pat. No. 3,607,640, enhance grid strength while maintaining coolant flow to the outer row of fuel rods. The perimeter strip 32 is also stamped so as to form, in sectors which alternate with the sectors provided with "windows" 34, inwardly extending integral springs 36. As may be seen from FIG. 4 by reference to fuel rod 12, each of the springs 36 cooperates with an internal spring 36' on a grid internal strip member to support and align a fuel rod of the outer row of the fuel assembly.

The perimeter strip 32 may also be provided, above and below each of the windows 34, with inwardly extending dimples 38. Dimples 38, in the manner known in the art, enhance the rigidity of perimeter strip 32. Restated, the presence of dimples 38 increases the resistance of strip 32 to bending in response to a force component directed along the length of the perimeter strip. Additionally, as may be seen in the case of fuel rod 12, dimples 38 function as stops or arches against which the fuel rod will be urged by the internal springs 20 and 22, integral with the strip members 46 and 46'. The dimples 38 must be provided above and below each of the perimeter strip "windows" 34. Additional parts of dimples 39 may also be provided in the perimeter strip sectors which have the integral springs 36 formed therein. In the interest of facilitating understanding of the drawing, the dimples 39 have not been shown in FIG. 3. When employed, dimples 39 will not extend into the fuel assembly sector as far as the fuel rod contacting springs 36. The dimples 39 will thus function as backup arches to prevent the elastic limit of springs 36 from being exceeded should the fuel assembly be subjected to vibration in excess of that encountered during normal operation. The pairs of dimples 39, if provided, will also enhance the rigidity of perimeter strip 32.

The perimeter strip 32 is also provided, above and below each of the windows 34, with an inwardly ridged horizontal rib 40, as may best be seen from joint consideration of FIGS. 5 and 6. Ribs 40, in the manner known in the art, also enhance the rigidity of the perimeter strip 32. The presence of the ribs 40 increases the section modulus of the perimeter strip and results in increased resistance to bending compared to a flat non-ribbed perimeter strip or a strip provided with a plurality of irregularities.

The valleys or slots defined by tabs 44 of the serrated upper and lower edges of perimeter strip 32 function as partial lead-in tabs for the fuel rods 12 which facilitate their insertion; the bases of the slots are aligned with the center of the windows 34 and springs 36 in the perimeter strip 32. The tabs 44 function as anti-hangup devices; these tabs 44 preventing the hanging or interference between adjacent fuel assemblies during refueling.

Figure 7:
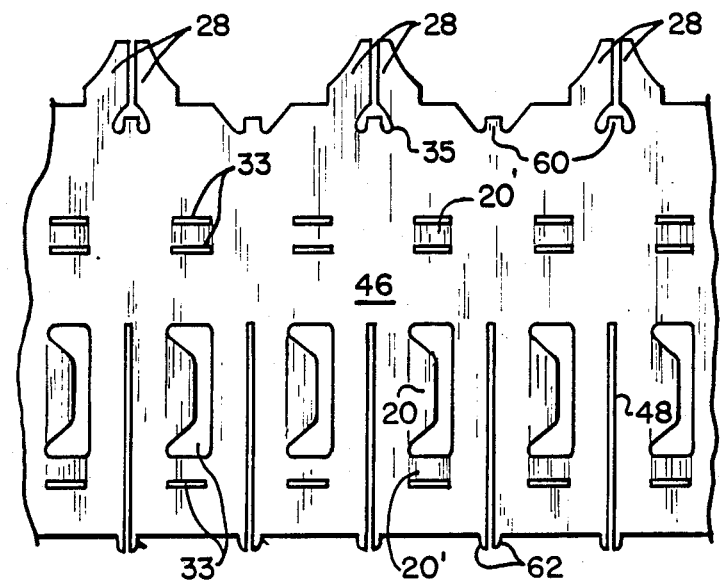
FIG. 7 is a fragmentary side-elevational view of upper grid interior strips which, when assembled with lower interior strips form the interior of the grid of this invention.
Figure 8:
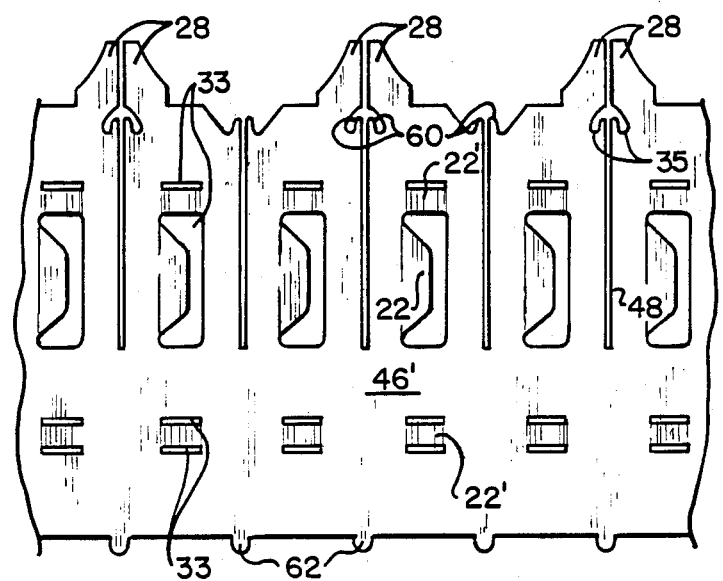
FIG. 8 is a fragmentary side-elevational view of lower grid interior strips which when assembled with upper interior strips of FIG. 7 form the interior of the grid of this invention.
Figure 9:
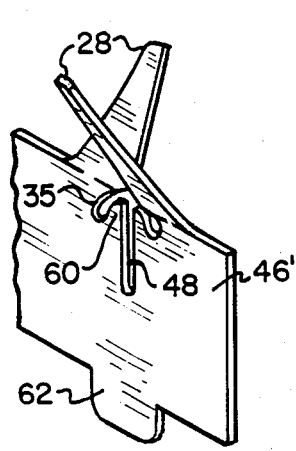
FIG. 9 is a partial isometric view of a lower grid interior strip with an integral flow deflector vane shown with respect to its location and shielding of upstream weld nuggets tabs before welding.

Interior strips 46,46' are provided with large unslotted sections which are kept free of large windows 34 or cutouts 33 and only contain one arch 20' or 22' in the section as can best be seen in FIGS. 7 and 8. The wide unslotted section with a minimum of windows 34 or cutouts 33 provides a larger load path than grids of prior art, which increases the resistance to bending of the strip and thus the strength of the grid. Strip slots 48 may also be tapered at the ends to facilitate the welding at the intermediate locations. The presence of intermediate welds increases the resistance to bending the strip and thus the strength of the grid.

To summarize the significant features of the spacer grid of FIGS. 4-12, the perimeter strip 32 is, when compared to the prior art, wider and contains stiffening dimples 38,39. The perimeter strip 32 of the spacer grid is also characterized by inwardly ridged horizontal upper and lower ribs 40 which also add to the stiffness of the strip. The connection between the perimeter strip 32 and the internal strip members 46,46' is defined by a weld seam of increased length along slot 30, when compared to prior art spacer grids, and the serrated upper and lower edges of the perimeter strip define anti-hangup tabs 44 and fuel rod lead-in features. Interior strips 46,46' have been provided with large unslotted sections which have been kept free of windows and any unnecessary cutouts. Also, intermediate welds may be associated with the grid interior strip to increase its rigidity and strength.

Tests have shown that the spacer grid of FIGS. 4-12 exhibits an improvement in impact strength and this increase in impact strength has been achieved with essentially no degradation in performance, perturbation in enrichment, or added resistance to coolant flow, i.e., no increase in pressure drop across the fuel assembly and with little change in the cost of fabrication of the grid.

In assembling a fuel assembly, an array of control rod guide tubes 16, FIG. 3, having control rods 50 adapted for slidable longitudinal movement therein, are positioned to extend axially through selected sectors in the grids 14 and are thereupon welded to grid tabs or strip walls to form the fuel assembly skeleton structure. Opposite ends of the guide tubes 16 are attached to top and bottom end fittings 52 and 54 using a unique threaded fastener.

Reference to the plan view of FIG. 4 illustrates the relative disposition of fuel rods 12 and guide tubes 16 and, particularly, how the fuel rods are held in a relatively immovable position in each grid. Each fuel rod 12 is biased by a spring 20 and 22 into engagement with arches 20' and 22' formed on the grid strip walls, and, as shown, project inwardly into each sector or cell 24. This construction serves to preclude axial movement of the fuel rods 12 in their grids 14 during the time the fuel assembly is being moved or transferred from one location to another. The arches are impressed in the strips 46,46' and dimples may be impressed in the peripheral strip 32 during the strip punching and stamping operation. After the appropriate grid strips 46,46' and 32 are assembled into the form of a grid 14, the arches project into each sector, except the sectors having control rod guide tubes 16, from two adjacent walls as shown in FIGS. 4 and 12.

Figure 10:
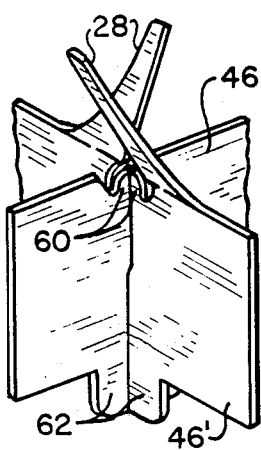
FIG. 10 is a partial isometric view of assembled upper and lower grid interior strips with integral flow deflector vanes shown with respect to their location and shielding of upstream weld nugget tabs before welding.
Figure 11:
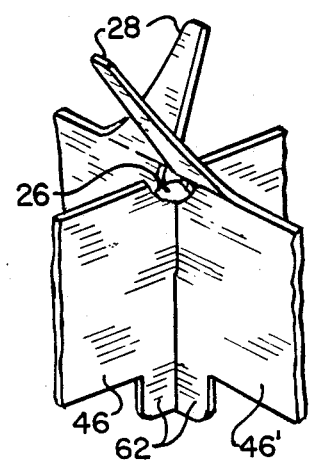
FIG. 11 is a partial isometric view similar to FIG. 10 and welding.
Figure 12:
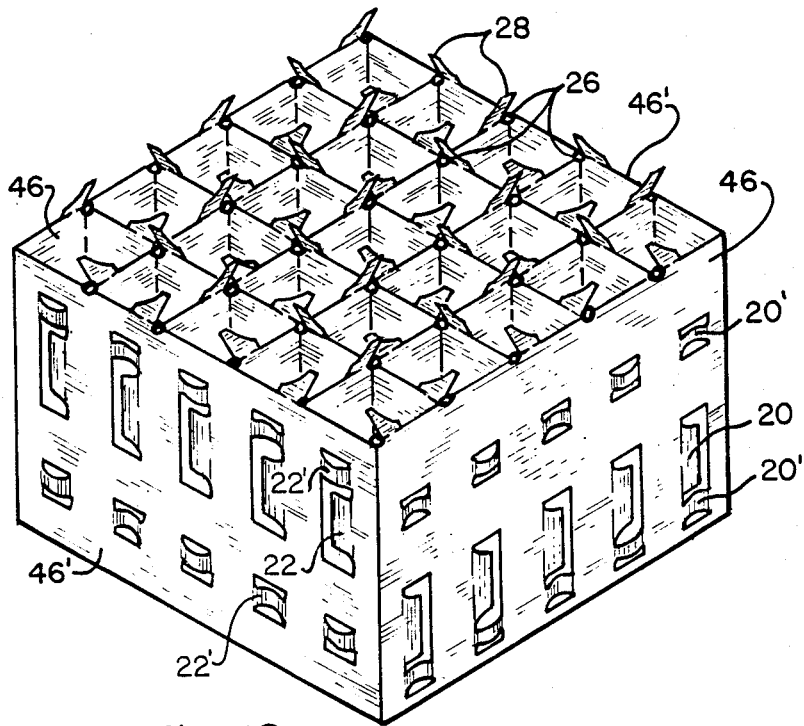
FIG. 12 is a partial isometric view of an interior section of an improved spacer grid for the fuel assembly of FIG. 3, which also illustrates the staggering of the fuel rod support features of FIGS. 7 and 8.

As shown in FIG. 12, the intersecting strips 46,46' are welded together at each junction with the weld nugget being designated 26. At each intersecting joint of the strips where a mixing vane is desired, there is provided a solid mixing vane 28 containing a longitudinally disposed slot 48. These mixing vanes are disposed so as to provide the desired directional flow of the fluid coolant as explained heretofore. Each vane shields a small opening or window 35 which, according to the preferred embodiment, is formed under the bottom end in each vane and directly above and adjacent to the junction of the intersecting strips. While the windows 35 are shown as oval, other shapes and configurations, such as rectangular, semi-circular, square, etc. can be employed. It is also possible to locate the window 35 and weld nugget 26 at different elevations within the grid 14. The function of the window 35 in each case is to create material and provide clearance for welding the strips 46,6' together. The placement of the weld 26, shielded by the vane 28, substantially eliminates flow separation on the downstream side of the mixing vane. This results in an improvement of the vane's fluid mixing capability between subchannels and rod heat transfer ability downstream of the vanes. The intersecting joints are formed in the usual manner by providing strips 46,46' with complementary slots 48 which are oriented as shown in FIGS. 7-11 for engagement. Slots 48 may be tapered at their ends if intermediate welds are required for additional grid strength.

The vane strips 46,46' are provided with an integrally formed vane 28. The vane strips 46,46' have formed therewith in the area where the window 35 is to be provided, a consumable weld tab 60,60' complementary to the shape of the window. The complementary spacer strip 46,46' is provided at its edge with a consumable weld tab 60 similar to consumable weld tab 60', only being unslotted which comprises a continuation of the slot 48 continuation line by virtue of the orientation of the consumable weld tab directly over the slot 48. These strips, when intersected as illustrated in FIG. 10, have their tabs similarly intersected. These tabs are made of a material such as zircaloy or Inconel which is consumed during the welding of the joints. The consumable weld tabs 60,60',62,62' are dissolved to form the weld nugget 26 as best illustrated in FIG. 11. The consumable weld tabs are integral with the intersecting strips 46,46' which are made of the same material.

By shielding the upper grid intersect welds 26 by the novel vane design, its reactor performance has been increased. FIGS. 1 and 2 show two different vane designs in operation. FIG. 2 illustrates the flow patterns seen when the shielded vane is employed. Flow separation on the downstream side of the mixing vane is minimized, thus improving the fluid mixing and rod heat transfer capability of the vanes. These conditions would include all anticipated flows during normal and transient core operations. By eliminating or at least reducing fluid separation, the pressure losses of the grid spacer 14 which are normally attributable to fluid friction and acceleration can be reduced, the directional movement of the fluid from one subchannel to another is improved, and the flow pattern generated by the vanes is more effective in cooling the rods. With the present invention, the fluid streamlines on the downstream surface of the mixing vane will assume a trajectory which is similar in many ways to a frictionless flow pattern. This advantage can be seen by looking at FIG. 1 which illustrates a typical prior art mixing vane which has a window at the spacer strip intersection joint. As shown, the flow streamlines have pressure differentials which result from acceleration differences between the flow on the upstream side, downstream side, and around the weld nugget thereby causing flow separation on the downstream side of the vane. This in turn reduces the extent of fluid directional change on the downstream side which is desired for purposes of obtaining uniform cooling of the fuel rods and subchannel mixing.

It will be appreciated from the foregoing description that a novel and improved nuclear fuel grid spacer 14 for a nuclear fuel reactor has been disclosed and enjoys significant advantages over conventional spacers as discussed heretofore.

We claim:

1. In a fuel element grid including integral springs for supporting a plurality of nuclear fuel elements intermediate their ends in spaced relation for fluid flow therebetween, said grid including a polygonal perimeter strip and a first and second plurality of half-slotted interlocking divider strip members arranged in a transverse intersecting egg-crate fashion to define a plurality of fuel element cells, the improvement in which: the fuel element support grid has each integral element support spring and definding cutout located in the slotted half of the divider members thereby making the material that is parallel and makes up the other half of the divider member unbroken by said half-slots and integral spring cutouts.

2. The grid of claim 1 in which the fuel element support grid includes integral support arches or dimples located adjacent to the support springs in the slotted half of each divider member.

3. The grid of claim 1 in which the transverse slotted fuel element support grid integral divider strips of the second plurality of half-slotted divider strip members intersecting the first plurality of half-slotted divider members and extending into a given cell do not have their support springs co-planar with the support springs of the first plurality.

4. The grid of claim 2 in which the transverse slotted fuel element support grid integral divider strips intersecting the first plurality of slotted divider members and extending into a given cell do not have their support arches co-planar with the support arches of the first plurality of slotted strips.

* * * * *